Jan. 18, 1966    E. R. LIGON    3,229,345
CLAY PIPE TAKE-OUT DEVICE

Filed July 10, 1963    9 Sheets-Sheet 1

INVENTOR.
ELMER R. LIGON
BY
Fishburn & Gold
ATTORNEYS

Jan. 18, 1966  E. R. LIGON  3,229,345
CLAY PIPE TAKE-OUT DEVICE
Filed July 10, 1963  9 Sheets-Sheet 3

INVENTOR.
ELMER R. LIGON
BY
Fishburn and Gold
ATTORNEYS

Jan. 18, 1966 E. R. LIGON 3,229,345
CLAY PIPE TAKE-OUT DEVICE
Filed July 10, 1963 9 Sheets-Sheet 4
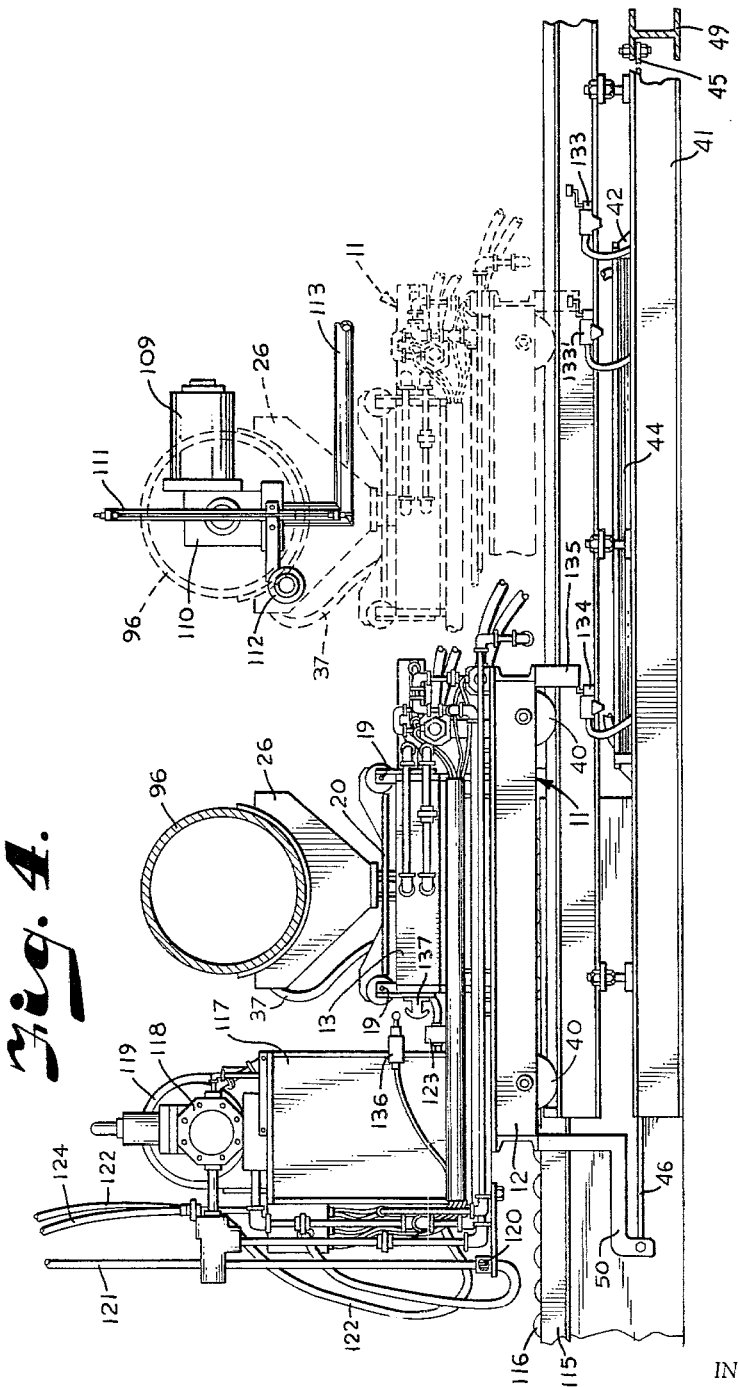
INVENTOR.
ELMER R. LIGON
BY
*Fishburn & Gold*
ATTORNEYS

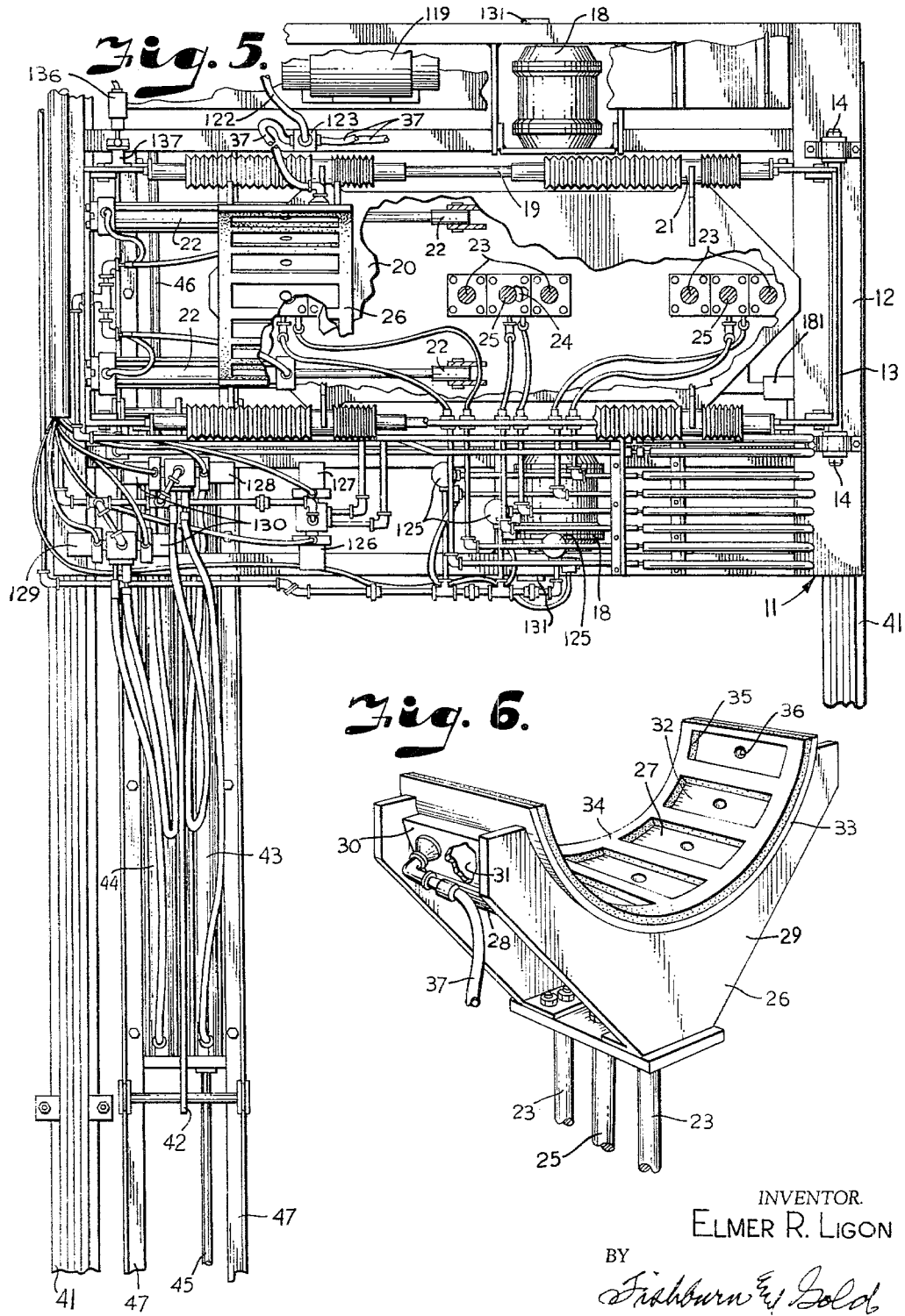

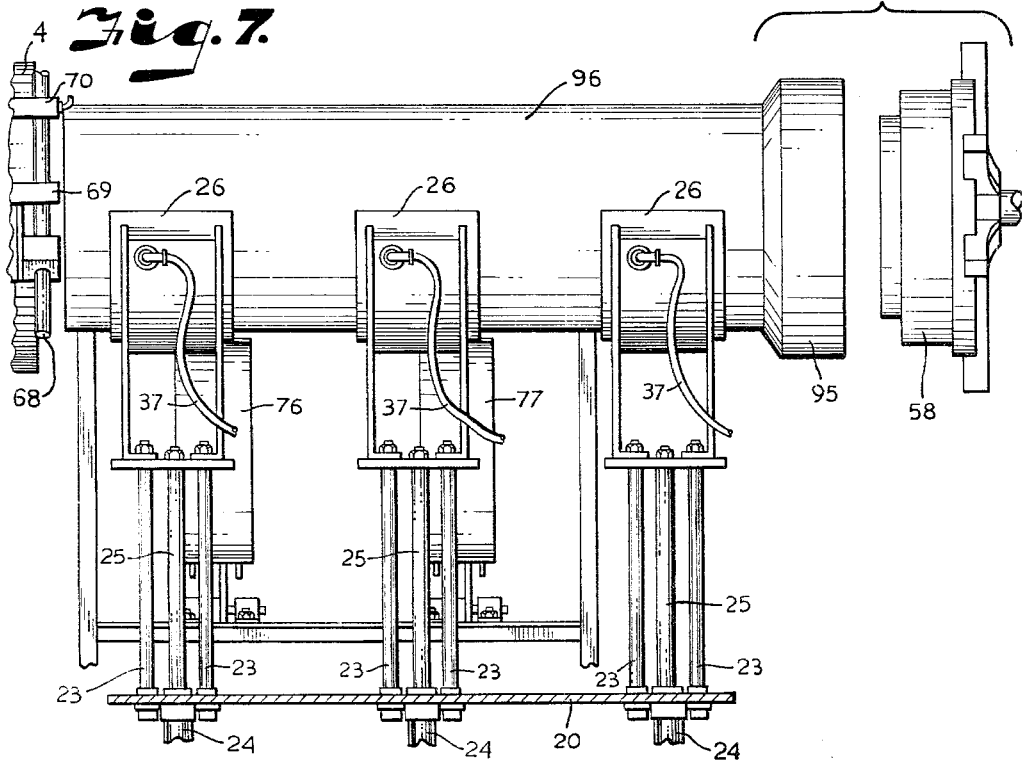
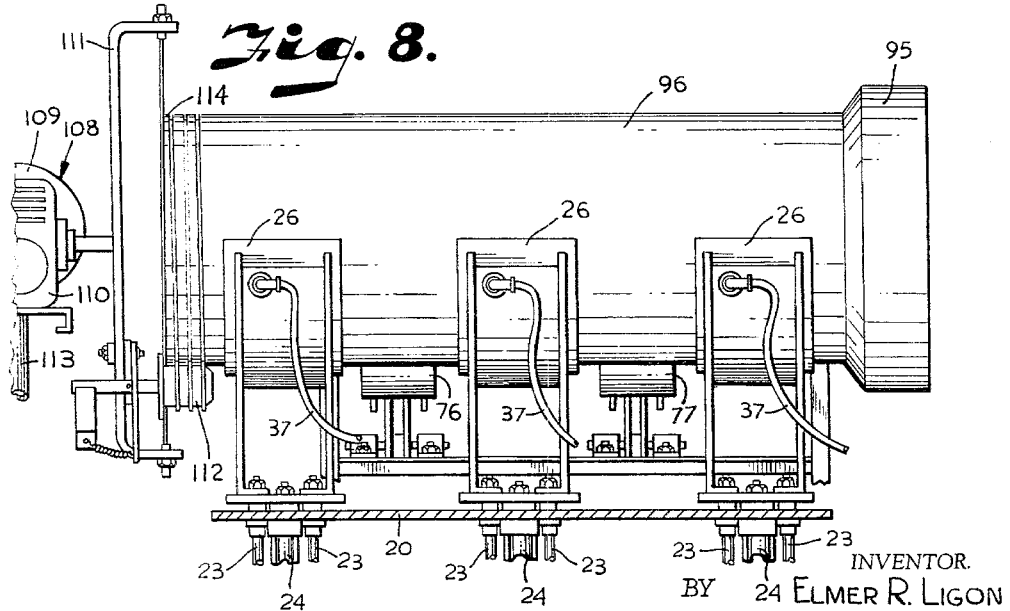

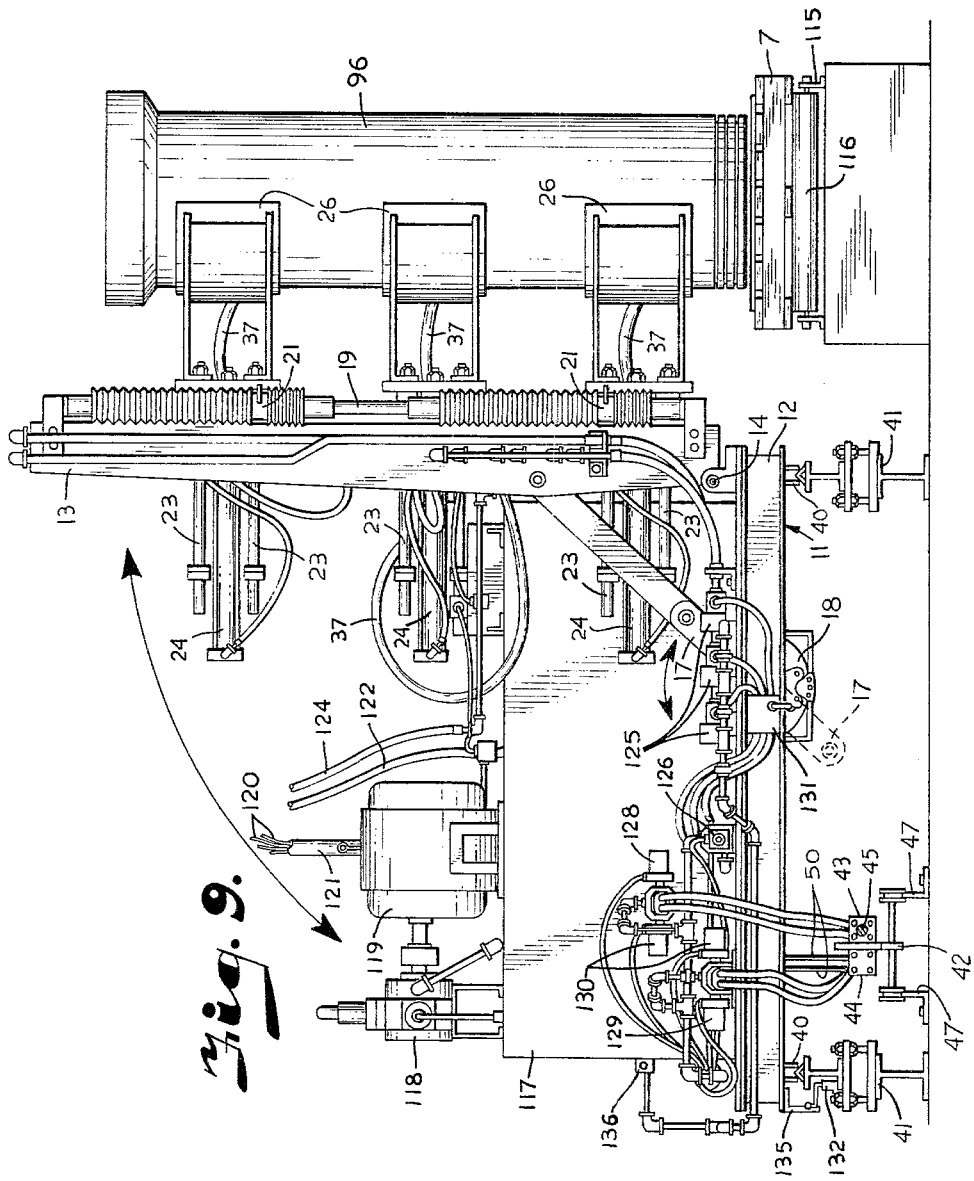

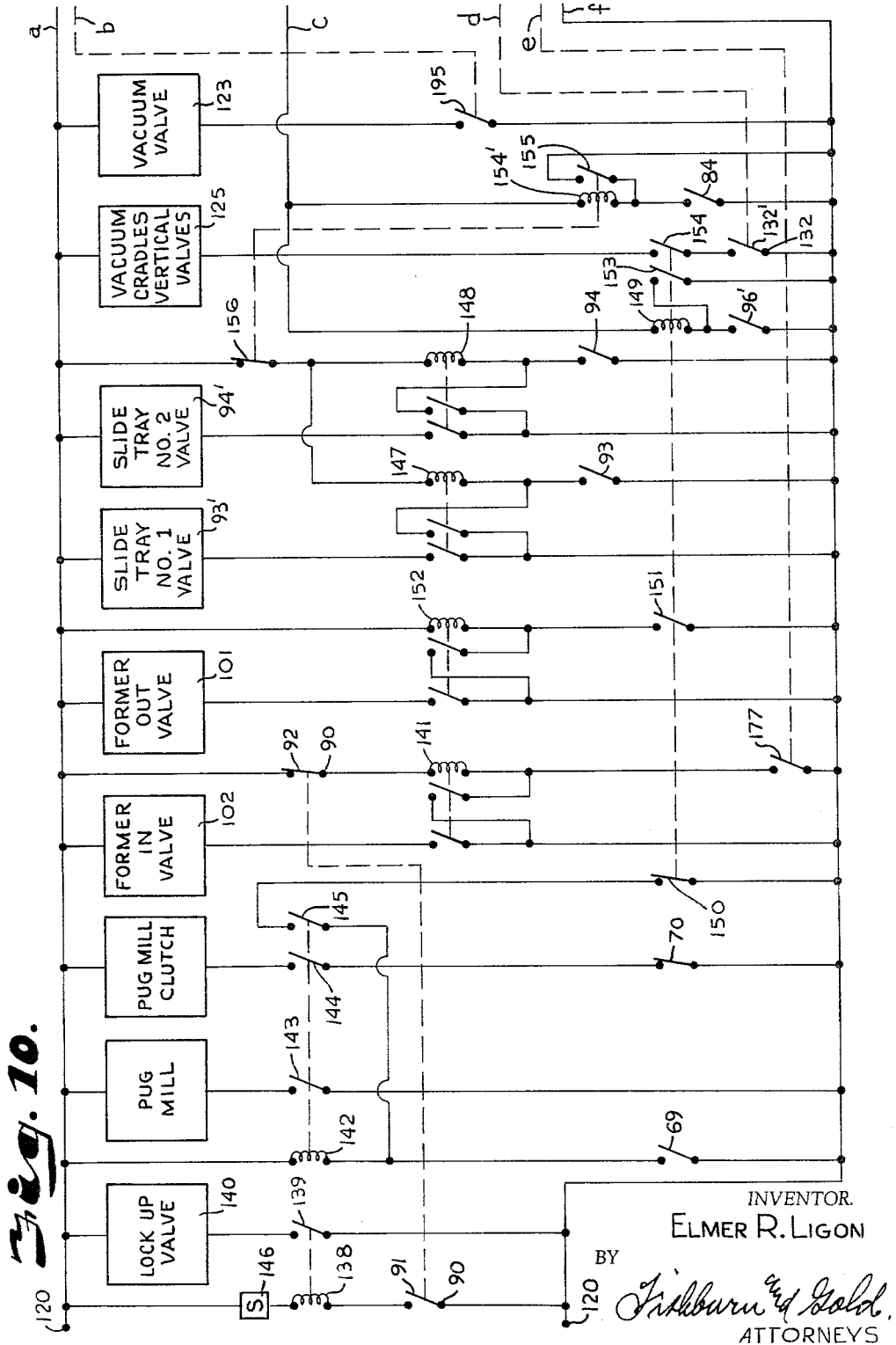

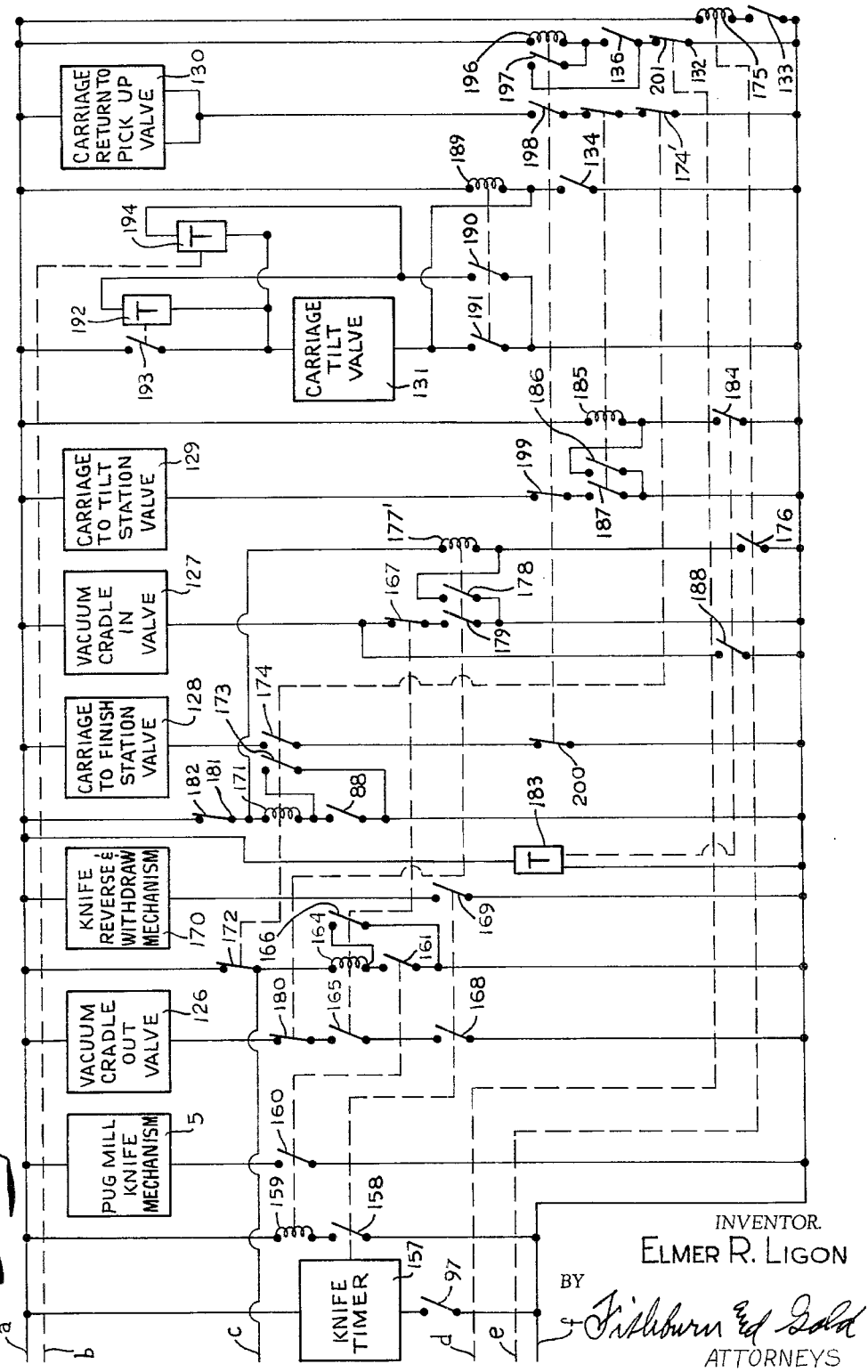

United States Patent Office 3,229,345
Patented Jan. 18, 1966

3,229,345
CLAY PIPE TAKE-OUT DEVICE
Elmer R. Ligon, Pittsburg, Kans., assignor to W. S. Dickey Clay Manufacturing Company, Kansas City, Mo., a corporation of Delaware
Filed July 10, 1963, Ser. No. 294,008
9 Claims. (Cl. 25—30)

This invention relates to an apparatus for handling soft clay pipe prior to drying preliminary to firing, and more particularly to a device adapted to receive a horizontally formed pipe from extruding machinery, perform finishing operations on the pipe and up-end same onto a conveyer pallet for transfer to a drying oven without subjecting the pipe to longitudinal bending or out-of-round distortion.

In recent years, clay pipe forming devices have been changed in operation from vertical steam presses to horizontal auger extrusion apparatus due to the higher quality product which may be produced by the latter method. In drying and firing operations, however, the pipe is rested on an end and extends vertically. With smaller sizes of pipe formed in horizontal extrusion machinery, the methods for up-ending have usually included the steps of gently rolling the pipe at right angles to its length on a flat table to a finishing station and then to a set-up station where set-up cradles lift the pipe from the horizontal to a vertical position onto a pallet for further processing. When the methods used on the smaller diameter pipe were attempted on larger pipe such as 12 to 15 inches in diameter and larger, it was found that such handling causes the pipe to become distorted into an out-of-round or egg shape due to line contact on the flat table and also often axially bent.

Machines for handling and up-ending larger diameter clay pipe extruded horizontally have been suggested; however, such devices have been highly complex and operated on modifications of the rolling method whereupon pipe distortion continued to be a problem, especially with pipe diameters of 15 inches and larger.

The principal objects of the present invention are: to provide a device for automatically receiving, transporting, finishing, up-ending and vertically depositing freshly extruded clay pipe up to very large diameters without longitudinal bending or out-of-round distorting; to provide such a device which does not use longitudinal line contact for supporting the pipe; to provide such apparatus which permits the extrusion to take place thereinto while finishing and up-ending operations are being performed on a preceding pipe; to provide such a device which is simple in structure but operates automatically, rapidly and with maximum efficiency; to provide soft clay pipe handling machinery of this type which uses contoured vacuum cradles for gently supporting the pipe both horizontally and vertically, vacuum being used only during a short period of time immediately preceding release so as to avoid the formation of bulges on the pipe outer surface; to provide such apparatus which supports the pipe in a plurality of spaced positions along the length thereof during extrusion by permitting sliding across trays shaped to the external contour of the pipe, the slide trays being automatically withdrawn when the weight of the pipe is transferred to the vacuum cradles; and to provide such equipment which eliminates rough handling and wherein the pipe remain gently and continuously contour-cradled from the die to the pallet board.

Other objects and advantages of this invention will become apparent from the following description taken in connection with the accompanying drawings wherein are set forth by way of illustration and example certain embodiments of this invention.

FIG. 4 is a fragmentary end elevation showing the vacuum cradle carriage at a finishing station (broken lines) and at a depositing or tilting station.

FIG. 5 is a fragmentary plan view on a larger scale showing details of the vacuum cradle carriage.

FIG. 6 is a fragmentary perspective view on a larger scale showing a vacuum cradle in greater detail.

FIG. 7 is a fragmentary side elevation illustrating the vacuum cradles shifted rearwardly away from the pug mill and the slide trays prior to lowering the pipe to finishing station elevation.

FIG. 8 is a fragmentary side elevation showing the vacuum cradles at the finishing station.

FIG. 9 is a fragmentary side elevation showing the vacuum cradle carriage at the depositing or tilt station with the pipe tilted to a vertical position immediately prior to release onto a pallet board.

FIG. 10 is the first half of a schematic wiring diagram illustrating the control circuit of the apparatus.

FIG. 11 is the second half of the wiring diagram of FIG. 10, the interconnections between FIGS. 10 and 11 being designated by like letters.

Figure 1:
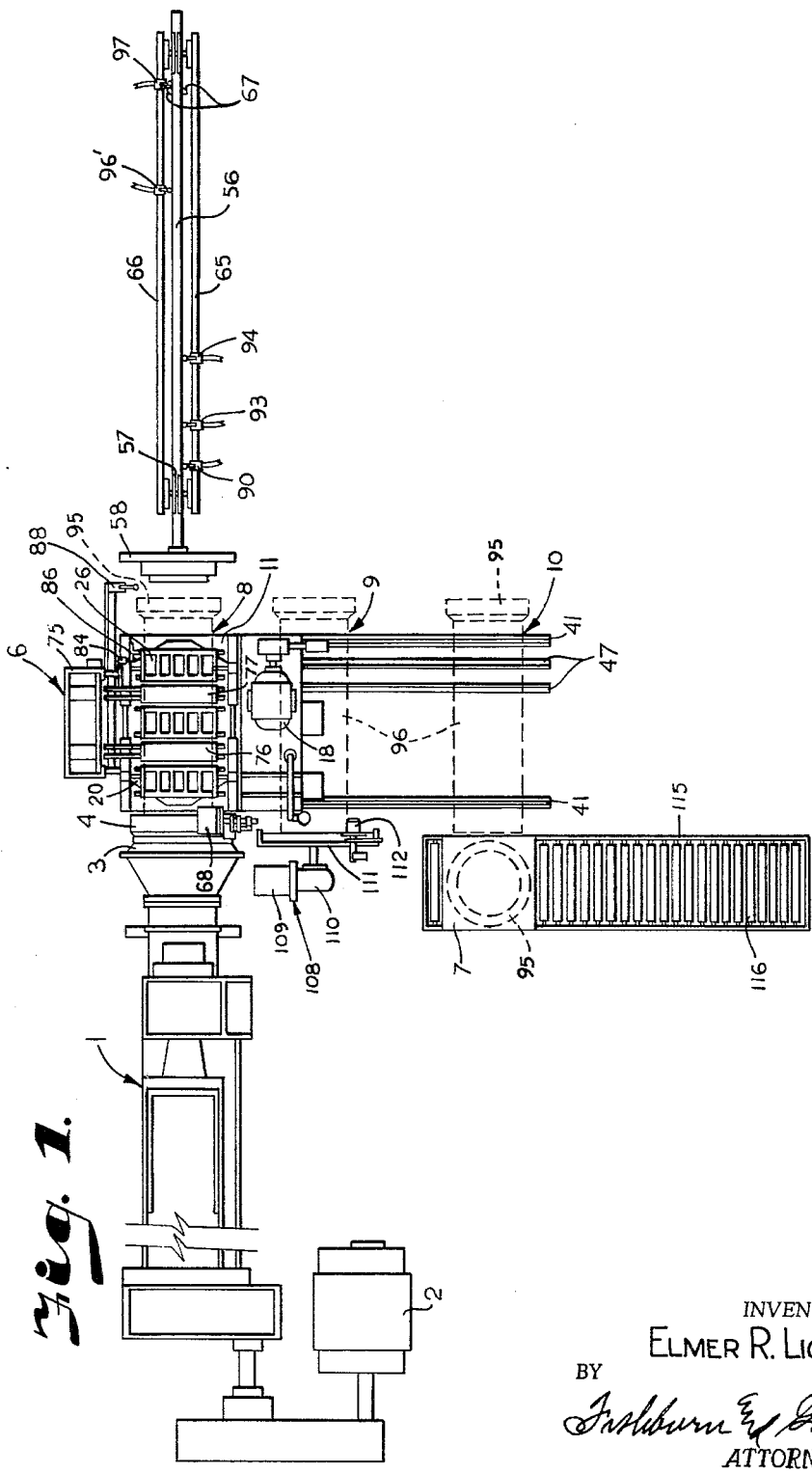
FIG. 1 is a partially schematic plan view of soft clay pipe handling apparatus embodying this invention.

Referring to the drawings in more detail:

The reference numeral 1 generally indicates a horizontally extending pug mill having a driving motor 2, tubular extrusion mold portion 3, pipe bell former mold portion 4, and pipe cutter mechanism 5 for intermittently horizontally extruding clay in the form of lengths of tubular pipe with a bell shape on the leading end thereof and severing the lengths when formed. The apparatus of this invention is broadly designated 6 and operates in conjunction with the pug mill 1 for automatically horizontally receiving, transporting, finishing, up-ending and depositing the extruded pipe vertically on a conveyor pallet 7 without pipe deformation. The apparatus 6 is broadly comprised of a receiving station 8, a finishing station 9, a depositing station 10, and a traveling transfer car or support carriage 11 which cooperates sequentially with the stations 8, 9 and 10.

Figure 2:
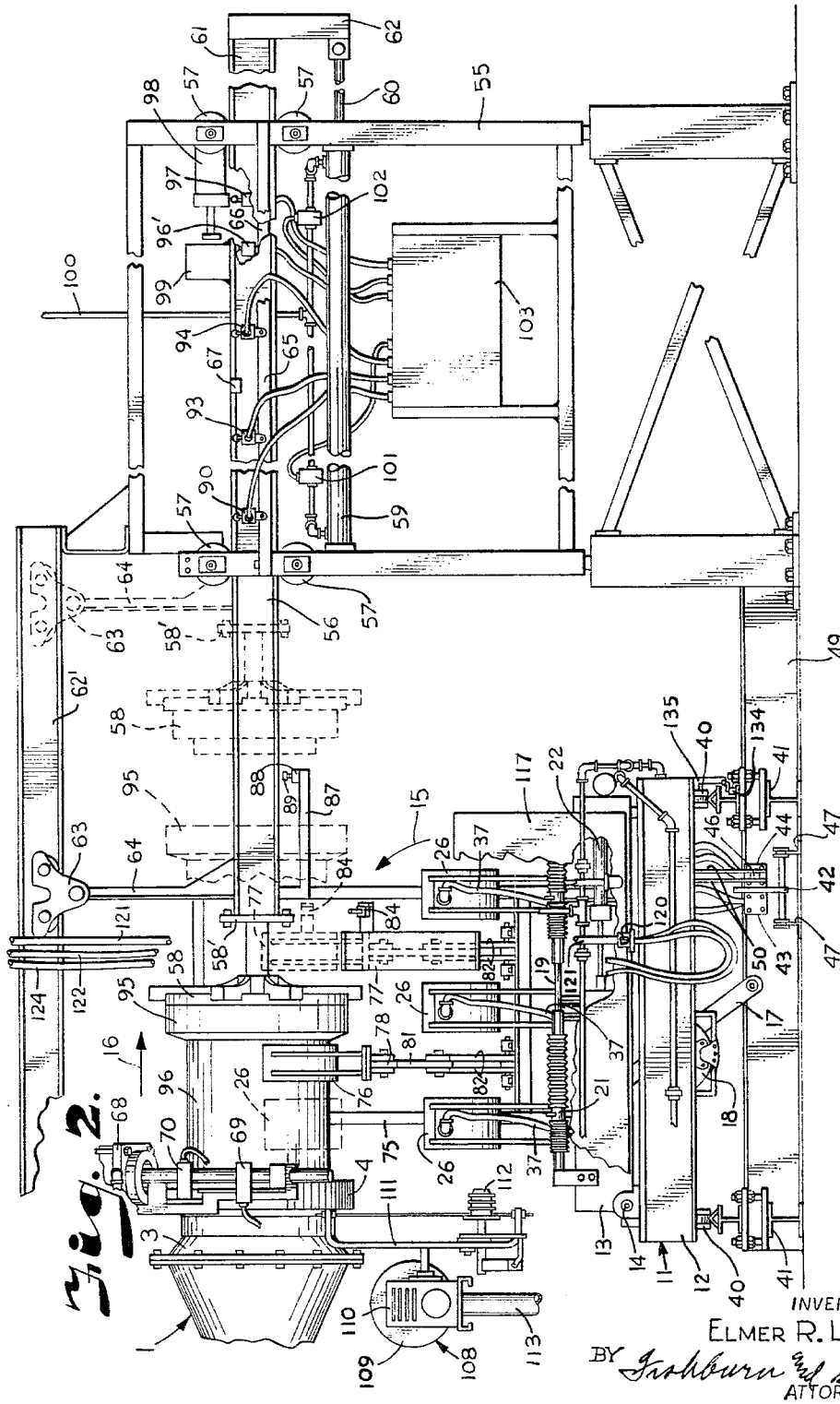
FIG. 2 is a fragmentary side elevation on a larger scale illustrating clay pipe being extruded horizontally from a pug mill and supported during extrusion by a slide tray prior to transfer onto vacuum cradles shown spaced therebelow on a carriage.

Referring particularly to FIG. 2, the carriage 11 has a horizontal lower frame portion 12 and a normally horizontal upper frame portion 13. The upper frame portion 13 is hinged to the lower frame portion 12 at 14 for pivoting vertically through an arc in a direction indicated by the arrow 15 which is opposed to the direction of pipe extrusion from the pug mill indicated by the arrow 16. Crank links 17 are operably connected between the upper and lower frame portions 12 and 13 and hydraulic motors 18 are fixed to the lower frame portion 12. The motors 18 are adapted to drive the crank links 17 for selectively pivoting the upper frame portion 13 about the hinge 14.

A pair of spaced-apart parallel guide bars 19 are secured to the upper frame portion 13 and extend parallel to the direction of pipe extrusion when the upper frame portion 13 is in its normally horizontal position. A normally horizontal table 20 is mounted by means of longitudinally slidable sleeve bearings 21 on the guide bars 19 for reciprocal movement therealong. Normally horizontal extension cylinders 22 are secured between the upper frame portion 13 and the table 20 for selectively reciprocating the table on the guide bars 19.

In the illustrated example, three normally vertical spaced-apart guide rod sets 23 slidably extend upwardly through the table 20. Three normally vertical horizontally spaced-apart depending extension cylinders 24 are fixed to the table 20 and have rods 25 slidably extending upwardly through the table between the rods of the respective rod sets 23. The cylinder rods 25 are respectively aligned in a plane parallel to the direction of pipe extrusion.

Spaced-apart vacuum cradles 26 are respectively mounted on the upper ends of the cylinder rods 25 and the guide rod sets 23 for movement therewith as the extension cylinders 24 are operated. The vacuum cradles 26 each have spaced-apart upper and lower curved walls 27 and 28 respectively and side walls 29 and end walls 30 joined together to form vacuum chambers 31 therebetween. The upper walls 27 each have an upper surface 32 in the form of approximately a 140-degree cylindrical section 33. The cylindrical sections 33 on each of the vacuum cradles 26 are coaxially aligned with each other and are normally axially aligned parallel to the axis of pipe extrusion.

The vacuum cradle upper surfaces 32 each have a layer 34 of approximately ¼-inch thick closed cell sponge rubber or the like adhesively secured thereto. The layers 34 each have a plurality of closed outline rectangular cut-out sections 35 extending transversely therethrough and exposing portions of the upper surfaces 32 forming pipe grips. Passageways 36 extend through the upper walls 27 and communicate between the upper surfaces 32 and the respective vacuum chambers 31. Vacuum lines 37 communicate with the respective vacuum chambers 31 and a suitable source of vacuum (not shown) for selectively withdrawing and admitting air thereto for gripping and releasing a clay pipe in the vacuum cradles against the pipe contacting surface of the layer 34 during the operating sequence discussed hereinafter.

The extension cylinders 24 are operatively interconnected for simultaneously vertically altering the elevation of the vacuum cradles 26 from a pipe receiving height illustrated in FIGURE 7 wherein the upper surfaces 32 are substantially coaxial with the axis of extrusion from the pug mill to a transfer height as illustrated in FIG. 8 which is below the receiving height.

Spaced-apart supporting track wheels 40 are mounted on the lower frame portion 12 and are rotatable in planes transverse to the direction of pipe extrusion. A pair of spaced-apart parallel tracks 41 extend in the planes of the track wheels 40 and support same for selectively guiding the carriage 11 sequentially to the respective stations 8, 9 and 10.

A floating carriage or car 42 is located between the rails 41 and has a pair of parallel oppositely directed extension cylinders 43 and 44 secured thereto and each having a rod 45 and 46 respectively extensible parallel to the rails 41. Tracks 47 are located between and extend parallel to the rails 41 for removably supporting the floating car 42 in a direction of motion parallel to the rails 41. The cylinder rod 45 is suitably anchored with respect to the apparatus 6, in the illustrated example on a cross beam 49 which is fixed with respect to the pug mill. The oppositely extending rod 46 is connected by means of a suitable bracket 50 to the lower frame portion 12 of the carriage 11. The extension cylinders 43 and 44 are respectively positioned whereupon the retraction of both the extension cylinders 43 and 44 places the carriage 11 at the receiving station 8. The extension of one of the cylinders 43 or 44, however, places the carriage at the finishing station 9 while the extension of both of the extension cylinders 43 and 44 places the transfer car at the depositing or tilting station 10.

A bell former supporting framework 55 is located adjacent the receiving station 8. An elongated horizontally extending beam 56 is longitudinally reciprocable on the framework 55 substantially coaxially of the pug mill mold portion 3 by means of suitable rollers 57. A bell former plug 58 is fixed to one end 58′ of the beam 56 for selective coaxial movement forwardly against the bell former portion 4 and rearwardly away therefrom.

An extensible cylinder 59 is secured at one end thereof to the framework 55 and has a rod 60 secured to the other end 61 of the beam 56 by means of a bracket 62 for selectively controlling and resisting movement of the former plug 58. A trolley track 62′ is suitably supported in a location spaced above the beam 56 and extending parallel thereto. A trolley 63 is suspended from the track 62′ and suitably secured by means of a suspending rod 64 to the beam 56 adjacent the former plug 58 for supporting same against downward deflection under pipe load during extrusion as described hereinafter.

A pair of scale rods 65 and 66 are mounted on the framework 55 parallel to and on opposite sides of the beam 56. The scale rods 65 and 66 support a plurality of arm-actuated switches, described hereinafter, which are sequentially actuated during reciprocal motion of the beam 56 by cam members 67 secured thereto.

A conventional bell former plug lock-up member 68 is located on the pug mill adjacent the bell former portion 4 for locking in the former plug during bell formation of the clay pipe. Limit switches 69 and 70 are secured to the lock-up member 68 and are operated during the actuation thereof for purposes described hereinafter.

Figure 3:
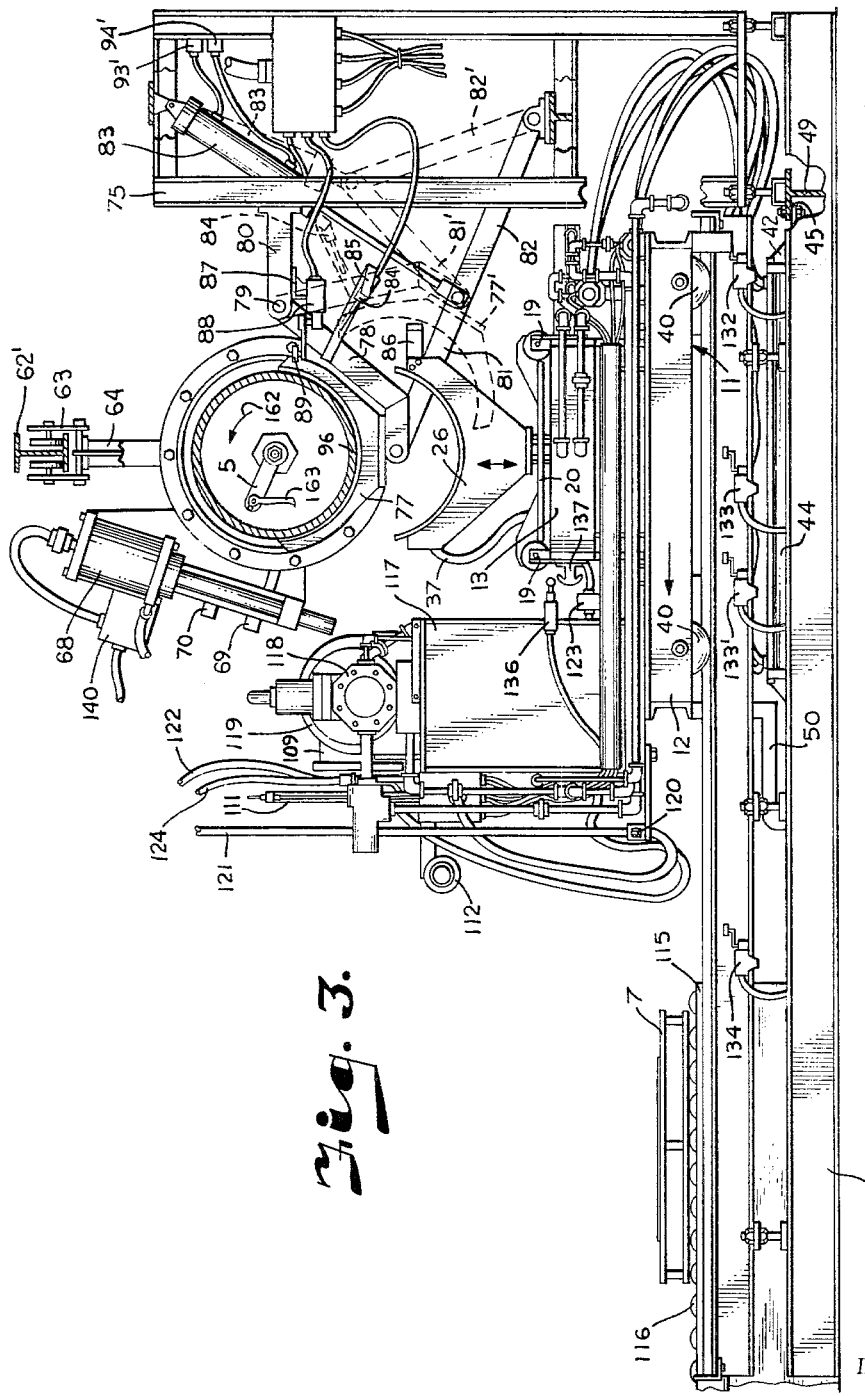
FIG. 3 is fragmentary end elevation showing the apparatus with the carriage at a receiving station immediately prior to raising the vacuum cradles.

A slide tray supporting framework 75 is located adjacent the receiving station 8 and, in the illustrated example, includes a pair of spaced-apart slide trays 76 and 77 positioned to selectively take positions between the respective vacuum cradles 26. The slide trays 76 and 77 are fixed on arms 78 which terminate in pivotal connections 79 on laterally extending brackets 80 suitably fixed to the supporting framework 75. The arms 78 support the slide trays 76 for swinging individually and sequentially from a pipe-supporting position, as illustrated in FIG. 3, to a vacuum cradle clearing position as illustrated by the broken lines 77′. Suitable scissors linkage arms 81 and 82 are pivotally connected to each other and to the arms 78 and framework 75 and also to suitable extension cylinders 83 for selectively moving the slide trays 76 and 77 between the above-noted alternate positions, the retracted position of the linkage arms 81 and 82 being illustrated by broken lines 81′ and 82′, in FIG. 3.

A limit switch 84 is mounted on an arm 85 secured to one of the arms 78 for bringing the switch 84 into position to contact an actuating bracket 86 secured to one of the vacuum cradles 26 when the respective slide tray is in a pipe-supporting position. The switch 84, the purpose of which is discussed below, is actuated when the vacuum cradles 26 come into supporting contact with the extruding pipe. An extension 87 is supported by the framework 75 and mounts a switch 88 having an arm 89 which is located in the path of the pipe for a purpose also discussed below.

Referring more specifically to the switches mentioned above which are mounted on the scale rods 65 and 66, a switch 90 is positioned for actuation by a cam member 67 when the former plug 58 is engaged in the pug mill bell former portion 4, the switch 90 (FIG. 2) having double contacts designated 91 and 92 (FIG. 10). Switches 93 and 94 are also mounted on the scale rod 65 and are respectively located in positions for being actuated by a cam member 67 when the bell end 95 of a pipe 96 being extruded moves just past the respective slide trays 76 and 77. Switches 96′ and 97, in the illustrated example, are also mounted on the scale rod 66 and are actuated when the former plug 58 is withdrawn rearwardly away from the bell end 95 and operate to initiate a sequence of events described below beginning with the actuation of the pipe cutter mechanism 5 to sever the extruded pipe 96 from the pug mill mold portion 3. A shock absorber 98 is fixed to the framework 55 and is adapted to contact a bracket 99 fixed to the beam 56 for stopping the bell former plug 58 upon its withdrawal from the bell end 95 of the pipe without undue shock load to the structure. Solenoid switches 93′ and 94′ control the extension cylinders 83 for positioning the slide trays 76 and 77.

A source (not shown) of air under pressure is connected to a supply pipe 100 which branches for directing the air through respective solenoid-operated valves 101 and 102 for controlling the forward and rearward motion or resistance to motion of the extension cylinder 59 and hence the former plug 58. Electrical wiring leading from the switches mounted on the scale rods 65 and 66 enters a suitable junction box 103 which contains various relays and control devices described hereinafter in connection with the circuit wiring diagram.

Trimming and finishing apparatus 108 is located adjacent the finishing station 9 and, in the illustrated example, comprises a driving motor 109, right angle gear reducer 110, stretched wire clay trimmer 111, and spigot corrugator 112. The trimming and finishing apparatus 108 is suitably substantially rigidly mounted on a support 113 and is adapted to axially receive the spigot end 114 of the pipe 96 in a manner described hereinafter for performing conventional length trimming and corrugating operations thereon.

The conveyor pallet 7 is located on a suitable conveyor 115, in the illustrated example having rollers 116 thereon for moving the pallet 7, with the pipe vertically resting thereon, horizontally away from the apparatus 6 from which the pipe and pallet may be transferred to drying ovens by automatic conveying apparatus (not shown) or lift trucks (not shown) as desired.

Since the weight of the pipe handled by the carriage 11 may be considerable, provision is made for preventing tilting of the lower frame portion 12 when the upper frame portion 13 is pivoted for depositing the pipe on the pallet 7 (FIG. 9). In the illustrated example, the carriage 11 is counterbalanced by an hydraulic fluid tank 117 containing the fluid needed to operate the various hydraulic extension cylinders and the hydraulic motors 18. An hydraulic pump 118 is positioned on the tank 117 and is driven by a suitable electric motor 119 mounted on the tank 117 for maintaining hydraulic pressure in the system as required. Electrical energy for the motor 119, as well as for operating solenoid valves, relays and other control equipment, is provided through electrical wires 120 contained in a vertically extending conduit 121 which travels with the transfer car 11 and connects at the upper end thereof to a suitable source of electrical energy. A vacuum line 122 extends adjacent the conduit 121 and is connected to a suitable source of vacuum (not shown). The vacuum line 122 is directed into suitable valve means 123 for selectively supplying vacuum to the vacuum cradles 26 and alternatively bleeding air thereinto for releasing vacuum in the chambers 31. Electrical control lines leading to the various control components on the transfer car 11 communicate therewith through a main control line 124 which also extends upwardly from the transfer car 11 with the conduit 121.

Solenoid control valves for the vacuum cradle vertical extension cylinders 24 are designated 125; solenoid valves for controlling the extension cylinders 22 for moving the vacuum cradles axially away from the pug mill are designated 126; and solenoid valves for axially moving the vacuum cradle toward the direction of the pug mill are indicated 127. Solenoid control valves for actuating the extension cylinder 44 to move the transfer car or carriage 11 from the receiving station 8 to the finishing station 9 is indicated 128. The valve control for moving the transfer car or carriage to the tilt station or depositing station 10 from the finishing station 9 is indicated 129. Valves operable to actuate the extension cylinders 43 and 44 to return the carriage from the tilt station to the receiving station 8 are designated 130. Suitable valves 131 are provided for remotely controlling the operation of the hydraulic motors 18 for selectively tilting the upper frame portion 13 through operation of the crank links 17.

The illustrated apparatus of this invention includes a plurality of limit switches mounted on one of the rails 41 and respectively designated 132, 133, 133' and 134 which control certain operations described hereinafter and are sequentially actuated by a depending cam bar 135, fixed to the transfer car lower frame portion 12, as the carriage moves along the rails. A switch 136 is located in fixed relation with the horizontal lower frame portion 12 and is adapted to be actuated by a cam arm 137 on the upper frame portion 13 just before the vacuum cradles have returned to a horizontal position. Further operating and controlling devices which are associated with the apparatus 6 will be brought out hereinafter in the discussion of apparatus operation.

By way of operation, it is assumed that the former plug 58 has moved axially forwardly into contact with the pug mill bell former portion 4. The double pole switch 90 is actuated by the cam member 67 which closes contacts 91 energizing relay coil 138 which causes the closing of contacts 139 energizing a lock-up valve 140 which, in turn, causes actuation of the lock-up member 68 for locking the former plug 58 in the bell former portion 4. The actuation of the switch 90 also opens contacts 92 which de-energizes the relay coil of a self-locking relay 141 for releasing the pressure in the beam extension cylinder 59 which urged the plug 58 against the pug mill, permitting subsequent pipe extrusion without undue longitudinal pressure in the direction toward the pug mill mold.

The locking of the lock-up member 68 causes actuation of the switch 69, energizing relay 142, which starts internal operation of the pug mill through contacts 143, closes contacts 144 which clutches in the pug mill to start actual extrusion of clay and closes contacts 145 for locking in the relay 142 in spite of the subsequent opening of the switch 69 when the lock-up member is reopened. The closing of the contacts 91 also energizes a switch device 146 which is set to operate when the bell former portion 4 is filled with clay under pressure for de-energizing the relay coil 138 resulting in unlocking of the lock-up member 68. As the lock-up device opens, the switch 70 is actuated momentarily de-clutching the pug mill for reducing pressure in the bell former portion 4 at the instant of plug release. The pug mill then extrudes the pipe body forcing the bell former plug 58 rearwardly under controlled pressure resulting from regulating the fluid pressure in the cylinder 59.

When the bell end 95 of the pipe has passed rearwardly slightly beyond the slide tray 76, the switch 93 is actuated by one of the cam members 67 on the beam 56 energizing relay 147 which, in turn, actuates and locks in the valve 93' causing the slide tray 76 to rise and enter into sliding contact with the body of the pipe 96 just behind the bell end 95 for slidably supporting the pipe against downward bowing during further extrusion. It is noted that the concave surface of the slide trays 76 and 77 is smooth and exactly contoured to the outside surface of the pipe body over a large arc so as to slide relative thereto without marking or distorting the pipe. As the bell end 95 continues to move away from the pug mill, it passes the position of the slide tray 77 which results in the switch 94 being actuated, energizing a relay 148, raising the slide tray 77 for the same purpose as the tray 76.

The pipe 96 continues to extrude until a cam member 67 contacts the switch 96' which energizes the relay 149 initiating the following events: Contacts 150 open, shutting off the pug mill; contacts 151 close, energizing relay 152 which actuates the valve 101 for withdrawing the former plug 58 rearwardly away from the bell end 95 of the pipe (FIG. 7); the relay 149 locks itself in energized position through the contacts 153; and contacts 154 close which initiates the rising of the vacuum cradles 26 provided that the contacts 132' are also closed due to the actuation of the track switch 132 by the transfer car 11 being in correct position beneath the pipe 96.

When the vacuum cradles 26 contact and support the pipe 96 adjacent and on opposite sides of the slide trays 76 and 77, the switch 84 is actuated by the bracket 86 which energizes relay 154'. Relay 154' locks itself in energized position through contacts 155 and opens contacts 156 causing the slide trays 76 and 77 to drop down and out of the way.

The pulling of the former plug 58 rearwardly from the bell end 95 of the pipe produces a high speed withdrawal motion which is gradually dissipated at the rearwardmost position of the former plug 58 by means of the bracket 99 striking the shock absorber 98. When the withdrawal position of the former plug 58 is reached, the switch 97 on the scale rod 66 is actuated, which energizes a knife timer 157. The knife timer 157 first closes contacts 158 which energizes relay 159, closing contacts 160 and 161. The contacts 160 energize the pug mill knife mechanism 5 which produces rotary motion in the direction indicated by the arrow 162 whereupon a knife blade 163 digs into the clay of the pipe within the pug mill mold severing same from the clay still within the mold. The closing of the contacts 161 causes energizing of a relay 164 which, in turn, closes contacts 165 and 166 and opens contacts 167. The closing of contacts 165 sets up the circuit for later energizing the valve 126 for axially moving the vacuum cradles 26 rearwardly away from the pug mill mold portion 3 to clear the pipe 96 for lateral motion. The contacts 166 bypass the contacts 161 for holding the relay 164 energized when the relay 159 is de-energized. The opening of the contacts 167 during the closing of the contacts 165 prevents the extension cylinders 22 from being actuated which would simultaneously urge the vacuum cradles axially both forwardly and rearwardly at the same moment.

When the knife mechanism 5 has revolved in the direction 162 for at least one full revolution, the timer 157 closes contacts 168 and 169, the former completing the circuit to move the pipe 96 axially rearwardly from the pug mill mold and the latter energizing a knife reverse and withdraw mechanism 170 which reverses the direction of the knife mechanism 5, causing withdrawal of the blade 163 and clearing the space in the mold for extrusion of the subsequent pipe.

When the vacuum cradles 26 have moved the pipe 96 clear of the pug mill, the bell end 95 strikes the switch 88 which energizes relay 171 opening contacts 172, which in turn de-energizes relay 149 dropping the vacuum cradles together to a lower level carrying the pipe 96 therewith. The opening of the contacts 172 also de-energizes the relay 154' reclosing the contacts 156 to permit slide tray raising during the subsequent pipe extrusion. The energizing of the relay 171 in addition closes contacts 173 for bypassing the contacts 88 and closes contacts 174 which causes the cylinder 43 to urge the carriage 11 to the finishing station 9. Simultaneously, contacts 174' are opened to prevent urging the carriage back toward the receiving station 8.

As the carriage moves along the rails 41 toward the finishing station, switch 133 on a rail 41 is actuated which energizes relay 175 closing contacts 176 and 177. The contacts 176 actuate relay 177' closing contacts 178 and 179 locking in relay 177' and starting the vacuum cradles axially toward the trimming and finishing apparatus 108 while the carriage is still traveling toward the finishing station 9. The contacts 177 momentarily energize the relay 141 which locks itself in while sending the former plug back into the pug mill mold for starting the subsequent pipe extrusion while the previous pipe is still being handled by the apparatus. It is noted that the energizing of the relay 177' also opens contacts 180 which prevents the vacuum cradles from being urged outwardly simultaneously with the signal for moving same inwardly toward the finishing apparatus 108.

The operating fluids going to the various extension cylinders are suitably metered so that the carriage has stopped in the finishing station well before the vacuum cradles have moved axially inwardly the full distance whereby the spigot end 114 of the pipe is moved into contact with the finishing apparatus 108 only after the carriage is stationary for suitably trimming and corrugating the pipe. When the vacuum cradles have reached the limit of axial motion toward the finishing apparatus 108, a switch 181 located on the upper frame portion 13 adjacent the table 20 (FIG. 5) is actuated opening contacts 182 which deactuates the relay 171 permitting subsequent extrusion, take-out and carriage return and deactuates the relay 177' which reverses the direction of the vacuum cradles starting same outwardly away from the finishing apparatus 108. The arrival of the carriage at the finishing station closes switch 133' energizing a timer 183 for subsequent operation. When the vacuum cradles have had time to back sufficiently so that the spigot end 114 of the pipe clears the finishing apparatus 108, the timer 183 times out, closing contacts 184 energizing relay 185 to close contacts 186 and 187. The contacts 186 lock in the relay 185 and the contacts 187 cause the valve 129 to send the carriage 11 to the depositing station 10. A short period after the order for moving the carriage to the depositing station 10, the timer 183 closes contacts 188 causing the vacuum cradles to move inwardly during motion toward station 10 in preparation for tilting.

When the carriage reaches the depositing station 10, the switch 134 is actuated which energizes relay 189. Relay 189 closes contacts 190 which energize a timer 192 adapted to immediately close contacts 193 in the circuit of the carriage tilt valve 131 and open same at a timed interval later. Contacts 191 are also closed by the relay 189 completing the circuit to the carriage tilt valve 131 causing tilting of the upper frame portion 13 to the vertical position illustrated in FIG. 9. The contacts 190 simultaneously energize a timer 194 which immediately closes contacts 195 applying vacuum to the vacuum cradles 26 before tilting has progressed appreciably. The timers 192 and 194 are respectively set so that the pipe 96 has reached a steady vertically extending rest position prior to timer 194 opening contacts 195 which causes the dropping of the pipe vertically approximately ¼-inch onto the pallet 7. Subsequently, the timer 192 times out, opening the contacts 193, causing the hydraulic motors 18 to reverse bringing the upper frame portion 13 back toward the horizontal. Immediately prior to the frame portion 13 again becoming horizontal, the switch 136 is actuated by the cam arm 137 which energizes relay 196 closing contacts 197 and 198 and opening contacts 199 and 200. The closing of contacts 197 bypasses the rail switch 136 and locks in the relay 196, and the closing of contacts 198 actuates the valves 130 for sending the transfer car or carriage back to the receiving station 8. The opening of contacts 199 and 200 holds deactuated the valves 128 and 129 which caused the carriage to move away from the receiving station toward the finishing and depositing stations.

During the finishing, tilting and release of the pipe, a subsequent pipe is being extruded and may be finished by the time the previous pipe has been deposited on the pallet. If so, the subsequent pipe is caused to wait until the carriage has arrived therebeneath in the receiving station 8 whereupon rail switch 132 is actuated, opening contacts 201 preparing the take-out and finishing circuits for another operation and closing contacts 132' preparing the circuit for raising the vacuum cradles to receive the pipe. Thus, the apparatus is used at maximum efficiency since the relatively long period required to extrude the pipe occurs simultaneously with other operations preparatory to and including the actual setting of the previous pipe on a conveyor pallet.

It is noted that the pipe is at all times firmly supported over a large area by contoured members and at various places along the length thereof, avoiding longitudinal bending and forces which would tend to induce out-of-roundness in the pipe. The pipe remains accurately and firmly cradled from the die to the conveyor pallet and all rolling and bumping steps are eliminated. The apparatus may be easily adapted to handle any size pipe horizontally extruded including very large diameters, the only apparent size limit being governed by the maximum available size of a suitable extruding pug mill. If desired, both the bell and spigot ends of the pipe may be suitably corrugated prior to tilting through the use of apparatus similar to that described.

It is to be understood that the automatic electrical circuit described in connection with this apparatus is only one example of many variations in circuitry which may be used to accomplish substantially the same purpose. As an illustration, it will be apparent to one skilled in the art that timers may often be substituted or replaced by limit switches, and metering devices in fluid pressure lines may often be substituted or replaced by timers. Further, it might be desirable to add further limit switches in various positions as safety devices to insure that certain steps cannot be initiated before the previous step has been completed rather than relying upon timers or metering devices to initiate the sequential steps. It is to be further understood that while one form of this invention has been illustrated and described, it is not to be limited to the specific form or arrangement of parts herein described and shown except insofar as such limitations are included in the claims.

What I claim and desire to secure by Letters Patent is:

1. In combination with clay pipe extruding machinery having a bell former mold and cutter for intermittently horizontally extruding and severing lengths of tubular pipe with a bell shape on one end thereof, take-out apparatus for receiving, transferring and upending the pipe with a minimum of pipe handling comprising; a carriage, transfer means on said carriage, normally horizontally extending cradle means carried by said transfer means and having a cylindrically curved pipe receiving and supporting surface, said cradle means including gripping means for gripping the pipe against said receiving and supporting surface, said transfer means having motive members for moving said cradle means receiving and supporting surface into adjacent axial alignment with said mold for horizontally receiving and supporting the pipe on said cradle means, guide members extending laterally away from said mold and engaging said carriage for guiding said carriage laterally away from said mold with the pipe thereon, motive means engaging said carriage for moving said carriage on said guide members from axial alignment with said mold to a tilting station, tilting means engaging said carriage for tilting said receiving and supporting surface from a horizontal position to a vertical position following movement of said carriage to said tilting station, and means for actuating said gripping means to maintain the pipe fixed against said receiving and supporting surface during vertical tilting, said last named means being responsive to subsequently release said gripping means for vertical release of the pipe from said receiving and supporting surface, said pipe remaining in fixed relation with respect to said receiving and supporting surface from horizontal receipt axially of said mold to vertical release.

2. In combination with clay pipe extruding machinery having a bell former mold and cutter for intermittently horizontally extruding and severing lengths of tubular pipe with a bell shape on the leading end thereof, take-out apparatus including; axially stationary slide tray means having a supporting surface slidable against the surface of said pipe for slidably supporting said pipe during extrusion, cradle means positionable adjacent said slide tray means and adapted to contact and support the pipe after extrusion is completed, means for withdrawing said slide tray means out of supporting contact with the pipe following contact and support by said cradle means, and means for moving said cradle means first axially and then laterally of said mold following severing.

3. In combination with clay pipe extruding machinery having a bell former mold and cutter for intermittently horizontally extruding and severing lengths of tubular pipe with a bell shape on the leading end thereof, take-out apparatus including; slide trays spaced apart axially of the pipe and adapted to sequentially rise into sliding contact therewith for supporting the pipe along the length thereof during extrusion, horizontally axially alignable cradles having vacuum grips and positionable adjacent said slide trays and adapted to rise into supporting contact with the pipe after extrusion is completed, means for withdrawing said slide trays away from the pipe after pipe contact with said cradles, means for moving said cradles axially away from said mold following the severing of the pipe, means for moving said cradles laterally away from said mold following said axial cradle movement, means for tilting said cradles from a horizontally axially aligned position to a vertically axially aligned position following at least part of said cradle lateral movement, and means adapted to apply a vacuum to said grips for holding the pipe during cradle tilting to the vertically aligned position and subsequently releasing said vacuum for vertical axial release of the pipe.

4. In combination with plug mill extrusion machinery having a bell former mold and cutter for intermittently horizontally extruding clay in the form of lengths of tubular pipe with a bell shape on the leading end thereof and severing the lengths when formed; a plurality of slide trays spaced apart axially of the pipe and adapted to sequentially rise into sliding contact therewith for supporting said pipe along the length thereof during extrusion, a carriage movable laterally of the pipe from a position therebeneath, a plurality of aligned spaced apart cradles supported on said carriage and having vacuum grips thereon, means on said carriage for elevating said cradles adjacent said slide trays into supporting contact with the pipe after the extrusion thereof is completed, means for withdrawing said slide trays out of contact with the pipe following the elevating of said cradles, means on said carriage for moving said cradles axially away from said mold, means operably connected to said carriage for moving same with said cradles laterally of said mold following said cradle axial motion, means on said carriage for tilting said cradles from a horizontally aligned pipe receiving position to a vertically aligned pipe depositing position, and means adapted to actuate said vacuum grips to apply a vacuum to the pipe for holding same during tilting and subsequently releasing said vacuum for vertical axial release of the pipe.

5. The combination as set forth in claim 4 wherein said means for moving said carriage is adapted to momentarily stop said carriage at a finishing position located between the extrusion position and the tilting position, and finishing means at said finishing position for operating on the pipe.

6. The combination as set forth in claim 4 wherein said carriage has a horizontal lower frame portion and a normally horizontal upper frame portion, said upper frame portion being hinged to said lower frame portion for pivotally tilting in an arc directed opposite to the direction of pipe extrusion, crank means operably connected between said upper and lower frame portions, and hydraulic motors fixed to said lower frame portion and adapted to drive said crank means for selectively tilting said upper frame portion.

7. The combination as set forth in claim 6 wherein said carriage includes a pair of spaced-apart parallel guide bars secured to said upper frame portion and normally extending parallel to the direction of pipe extrusion, a normally horizontal table slidably mounted on said guide bars for reciprocal movement therealong, and normally horizontal extension means secured between said upper frame portion and said table for selectively reciprocating said table, said cradles being mounted for vertical elevation on said table.

8. The combination as set forth in claim 7 including; spaced-apart supporting track wheels on said lower frame portion and rotatable in planes transverse to the direction of pipe extrusion, a pair of spaced-apart parallel rails extending in the planes of said track wheels and supporting said track wheels for selectively guiding said carriage sequentially between a pipe extrusion position and a finishing position and a tilting position, and a floating car between said rails and having a pair of oppositely directed extension cylinders secured thereto, each of said extension cylinders having rods extensible therefrom, track means between said rails for movably supporting said floating car in the direction of carriage movement, one of said cylinder rods being anchored with respect to said extrusion machinery and the other being connected to said carriage whereupon the retraction of both cylinder rods places said carriage at said pipe extrusion position and the extension of one of said cylinders places said carriage at said finishing position and the extension of both of said cylinders places said carriage at said tilting position.

9. In combination with clay pipe extruding machinery having a bell former mold and cutter for intermittently horizontally extruding and severing lengths of tubular pipe with a bell shape on the leading end thereof, take-out apparatus including; slide tray means for slidably supporting said pipe during extrusion, cradle means positionable adjacent said slide tray means and adapted to contact and support the pipe after extrusion is completed, means for withdrawing said slide tray means out of supporting contact with the pipe following contact and support of said cradle means, means for moving said cradle means axially and laterally of said mold following severing, means for tilting said cradle means from a horizontal position to a vertical position, means for securing the pipe in said cradle means, and means adapted to actuate said securing means for holding the pipe during tilting to said vertical position and subsequently releasing said securing means for vertical axial release of the pipe, said slide tray means comprising a slide tray supporting framework adjacent said extruding machinery and having a plurality of spaced apart slide trays pivotally mounted thereon, said slide tray supporting framework including linkage means for selectively pivoting said slide trays individually and sequentially from a pipe-supporting position to a position for clearing said cradle means during the axial motion thereof, and extensible cylinders respectively secured to said slide tray supporting framework for actuating said respective linkage means.

References Cited by the Examiner
UNITED STATES PATENTS

| | | | |
|---|---|---|---|
| 1,959,512 | 5/1934 | Wall et al. | 25—1 |
| 2,391,424 | 12/1945 | Keplinger et al. | 25—14 |
| 2,396,614 | 3/1946 | Somes | 214—1 |
| 2,716,265 | 8/1955 | Webb | 25—40 |
| 2,795,027 | 6/1957 | Rossier | 25—39 |
| 3,089,722 | 5/1963 | Creskoff | 294—65 |
| 3,139,301 | 6/1964 | Olson et al. | 294—64 |

FOREIGN PATENTS

| | | |
|---|---|---|
| 662,322 | 7/1938 | Germany. |

J. SPENCER OVERHOLSER, *Primary Examiner.*

ROBERT F. WHITE, MICHAEL V. BRINDISI, WILLIAM J. STEPHENSON, *Examiners.*